US008843822B2

(12) United States Patent
Claux et al.

(10) Patent No.: US 8,843,822 B2
(45) Date of Patent: Sep. 23, 2014

(54) INTELLIGENT PRIORITIZATION OF ACTIVATED EXTENSIONS

(75) Inventors: David Claux, Redmond, WA (US);
Jason Todd Henderson, Tacoma, WA (US); Oleg Ouliankine, Redmond, WA (US); Michael Anthony Faoro, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 47 days.

(21) Appl. No.: 13/361,219

(22) Filed: Jan. 30, 2012

(65) Prior Publication Data

US 2013/0198623 A1    Aug. 1, 2013

(51) Int. Cl.
*G06F 17/22* (2006.01)
*G06F 9/44* (2006.01)

(52) U.S. Cl.
USPC ........... 715/273; 715/234; 715/760; 715/762; 717/120; 717/177

(58) Field of Classification Search
USPC ......... 715/200, 201, 202, 203, 204, 205, 207, 715/208, 210, 234, 243, 255, 256, 273, 700, 715/713, 750, 751, 752, 760, 761, 762, 763, 715/764, 797, 853; 717/100, 114, 115, 116, 717/120, 148, 173, 174, 177
See application file for complete search history.

(56) References Cited

U.S. PATENT DOCUMENTS

| | | |
|---|---|---|
| 5,349,658 A | 9/1994 | O'Rourke et al. |
| 5,877,757 A | 3/1999 | Baldwin et al. |
| 5,986,657 A | 11/1999 | Berteig et al. |
| 6,530,075 B1* | 3/2003 | Beadle et al. .................. 717/114 |
| 6,754,896 B2 | 6/2004 | Mishra et al. |
| 6,785,867 B2* | 8/2004 | Shaffer et al. .................. 715/203 |
| 7,000,230 B1 | 2/2006 | Murray et al. |
| 7,136,843 B2 | 11/2006 | Bigus et al. |
| 7,233,792 B2 | 6/2007 | Chang |
| 7,243,336 B2* | 7/2007 | Brockway et al. ............ 717/120 |
| 7,284,191 B2 | 10/2007 | Grefenstette et al. |
| 7,333,956 B2 | 2/2008 | Malcolm |
| 7,360,167 B2 | 4/2008 | Hennum et al. |
| 7,506,263 B1 | 3/2009 | Johnston et al. |
| 7,529,804 B1 | 5/2009 | Lu et al. |
| 7,707,257 B2 | 4/2010 | Taieb et al. |
| 7,765,212 B2 | 7/2010 | Surendran et al. |
| 7,779,027 B2 | 8/2010 | James et al. |
| 7,861,167 B2 | 12/2010 | Fernando et al. |

(Continued)

OTHER PUBLICATIONS

International Search Report and Written Opinion for PCT/US2013/020915 mailed Apr. 23, 2013, 10 pgs.

(Continued)

*Primary Examiner* — Maikhanh Nguyen
(74) *Attorney, Agent, or Firm* — Louise Bowman; Jim Ross; Micky Minhas

(57) ABSTRACT

Extension prioritization may be provided. Upon opening a document in a software application, a determination may be made whether the document satisfies a respective activation rule for each of a plurality of application extensions associated with the software application. In response to determining that the document satisfies a respective activation rule for each of a plurality of application extensions associated with the software application a priority may be identified for each of the plurality of application extensions and a user interface element associated with at least one of the plurality of application extensions may be displayed.

14 Claims, 5 Drawing Sheets

(56) References Cited

U.S. PATENT DOCUMENTS

| | | | |
|---|---|---|---|
| 7,912,822 B2* | 3/2011 | Bethlehem et al. | 707/705 |
| 8,010,613 B2 | 8/2011 | Oral et al. | |
| 8,024,412 B2 | 9/2011 | McCann et al. | |
| 8,074,217 B2 | 12/2011 | James et al. | |
| 8,220,007 B1* | 7/2012 | Yeh et al. | 719/331 |
| 8,250,518 B2* | 8/2012 | Averett et al. | 717/100 |
| 8,255,280 B1 | 8/2012 | Kay et al. | |
| 8,429,286 B2 | 4/2013 | Pantos | |
| 2002/0059347 A1* | 5/2002 | Shaffer et al. | 707/516 |
| 2002/0103824 A1 | 8/2002 | Koppolu et al. | |
| 2003/0126592 A1 | 7/2003 | Mishra et al. | |
| 2003/0196172 A1 | 10/2003 | Bates et al. | |
| 2004/0034860 A1 | 2/2004 | Fernando et al. | |
| 2004/0059813 A1 | 3/2004 | Bolder et al. | |
| 2004/0117799 A1 | 6/2004 | Brockway et al. | |
| 2004/0119745 A1 | 6/2004 | Bartek et al. | |
| 2005/0033728 A1* | 2/2005 | James et al. | 707/1 |
| 2005/0091184 A1 | 4/2005 | Seshadri et al. | |
| 2005/0144318 A1 | 6/2005 | Chang | |
| 2005/0188174 A1 | 8/2005 | Guzak et al. | |
| 2005/0289113 A1 | 12/2005 | Bookstaff | |
| 2005/0289535 A1 | 12/2005 | Murray et al. | |
| 2006/0004739 A1 | 1/2006 | Anthony et al. | |
| 2006/0036965 A1* | 2/2006 | Harris et al. | 715/777 |
| 2006/0069836 A1 | 3/2006 | Seo et al. | |
| 2006/0101053 A1 | 5/2006 | Proctor | |
| 2006/0155812 A1 | 7/2006 | Looman | |
| 2006/0168136 A1 | 7/2006 | Bethlehem et al. | |
| 2006/0173859 A1 | 8/2006 | Kim et al. | |
| 2006/0218488 A1 | 9/2006 | Shah et al. | |
| 2007/0061401 A1 | 3/2007 | Bodin et al. | |
| 2007/0094408 A1 | 4/2007 | Gundla et al. | |
| 2007/0156913 A1 | 7/2007 | Miyamoto et al. | |
| 2007/0226204 A1 | 9/2007 | Feldman | |
| 2007/0240098 A1 | 10/2007 | Averett et al. | |
| 2007/0244987 A1 | 10/2007 | Pedersen et al. | |
| 2007/0261066 A1* | 11/2007 | Miyamoto et al. | 719/320 |
| 2008/0109448 A1 | 5/2008 | Aboel-Nil et al. | |
| 2008/0134162 A1 | 6/2008 | James et al. | |
| 2008/0155555 A1* | 6/2008 | Kwong | 719/315 |
| 2008/0189360 A1 | 8/2008 | Kiley et al. | |
| 2008/0244440 A1* | 10/2008 | Bailey et al. | 715/777 |
| 2008/0244443 A1* | 10/2008 | Schaw et al. | 715/788 |
| 2008/0294730 A1 | 11/2008 | Oral et al. | |
| 2008/0307046 A1 | 12/2008 | Baek et al. | |
| 2009/0006201 A1 | 1/2009 | Faseler, Jr. | |
| 2009/0044146 A1 | 2/2009 | Patel et al. | |
| 2009/0094332 A1 | 4/2009 | Schemers et al. | |
| 2009/0150981 A1 | 6/2009 | Amies et al. | |
| 2009/0164427 A1 | 6/2009 | Shields et al. | |
| 2009/0193444 A1 | 7/2009 | Clark et al. | |
| 2009/0210800 A1* | 8/2009 | McCann et al. | 715/752 |
| 2009/0265139 A1 | 10/2009 | Klein et al. | |
| 2009/0265330 A1 | 10/2009 | Cheng et al. | |
| 2009/0300597 A1 | 12/2009 | George et al. | |
| 2009/0307652 A1 | 12/2009 | Maybee et al. | |
| 2009/0313554 A1 | 12/2009 | Haynes et al. | |
| 2009/0319911 A1 | 12/2009 | McCann et al. | |
| 2010/0011352 A1 | 1/2010 | Chu et al. | |
| 2010/0153915 A1 | 6/2010 | Schneider | |
| 2010/0262557 A1 | 10/2010 | Ferreira et al. | |
| 2010/0287525 A1 | 11/2010 | Wagner | |
| 2011/0029988 A1 | 2/2011 | Mittal et al. | |
| 2011/0072352 A1 | 3/2011 | Tanner et al. | |
| 2011/0087984 A1 | 4/2011 | Jitkoff et al. | |
| 2011/0093801 A1 | 4/2011 | Koyama et al. | |
| 2011/0113450 A1 | 5/2011 | Sharma et al. | |
| 2011/0145749 A1 | 6/2011 | Sailor et al. | |
| 2011/0154312 A1 | 6/2011 | Balko et al. | |
| 2011/0209159 A1 | 8/2011 | Baratz et al. | |
| 2011/0289056 A1 | 11/2011 | Xue et al. | |
| 2012/0005155 A1 | 1/2012 | Lynch et al. | |
| 2012/0023421 A1 | 1/2012 | Demant et al. | |
| 2012/0084644 A1 | 4/2012 | Robert et al. | |
| 2012/0094719 A1 | 4/2012 | Choi et al. | |
| 2012/0144282 A1 | 6/2012 | Loeb et al. | |
| 2013/0076598 A1 | 3/2013 | Sirpal et al. | |
| 2013/0151942 A1 | 6/2013 | Ouliankine et al. | |
| 2013/0185362 A1 | 7/2013 | Clagg et al. | |
| 2013/0198627 A1 | 8/2013 | Claux et al. | |
| 2013/0198647 A1 | 8/2013 | Claux et al. | |

OTHER PUBLICATIONS

International Search Report and Written Opinion for PCT/US2013/022823 mailed May 10, 2013, 10 pgs.

International Search Report and Written Opinion for PCT/US2013/022826 mailed May 10, 2013, 11 pgs.

International Search Report and Written Opinion for PCT/US2013/022615 mailed May 16, 2013, 9 pgs.

U.S. Office Action dated Jul. 16, 2013 cited in U.S. Appl. No. 13/361,140, 22 pgs.

U.S. Office Action dated Aug. 13, 2013 cited in U.S. Appl. No. 13/351,310, 36 pgs.

Rex Thexton et al., "A Role-Based Approach to Automated Provisioning and Personalized Portals," Jan. 2011, 7 pgs., http://www.oracle.com/technetwork/articles/role-based-automated-provisioning-213244.html.

U.S. Appl. No. 13/315,314, filed Dec. 9, 2011, entitled "Inference-Based Extension Activation".

U.S. Appl. No. 13/361,097, filed Jan. 30, 2012, entitled "Extension Activation for Related Documents".

U.S. Appl. No. 13/361,140, filed Jan. 30, 2012, entitled "Dynamic Extension View With Multiple Levels of Expansion".

U.S. Appl. No. 13/351,310, filed Jan. 17, 2012, entitled "Installation and Management of client Extensions".

"Gmail Contextual Gadgets Developer's Guide", Retrieved on: Oct. 17, 2011, Available at: http://code.google.com/apis/gmail/gadgets/contextual/.

Nedos, et al., "LATTE: Location and Time Triggered Email", In Proceedings of the International Conference on Pervasive Computing and Communications, Jun. 21-24, 2004, pp. 813-819.

Aery, et al., "eMailSift: Email Classification Based on Structure and Content", In Proceedings of the Fifth IEEE International Conference on Data Mining, Nov. 27-30, 2005, pp. 18-25.

Bekkerman, et al., "Automatic Categorization of Email into Folders: Benchmark Experiments on Enron and SRI Corpora", In CIIR Technical Report IR-418, University of Massachusetts, 2004, pp. 1-23.

"Changes in Outlook 2010", Retrieved on: Oct. 10, 2011, Available at: http://technet.microsoft.com/en-us/library/cc179110.aspx.

"Extension Plug-ins for Processing Messages", Retrieved on: Oct. 10, 2011, Available at: http://docs.blackberry.com/en/admin/deliverables/25767/Ext_plugins_for_processing_msgs_595319_11.jsp.

"Glovia G2 Web Client—Full Windows Graphical user Interface Client within any Browser Supporting ActiveX" Retrieved on: Oct. 10, 2011, Available at: http://www.glovia.com/pdf/datasheets/GloviaWebClient.pdf.

"Installing Content Collector Notes Client Extension in Silent Mode", Retrieved on: Oct. 10, 2011, Available at: http://publib.boulder.ibm.com/infocenter/email/v2r2m0/index.jsp?topic=%2Fcom.ibm.content.collector.doc%2Finstalling%2Ft_afu_install_nce_silent.htm.

"Manage Windows and Panels", Retrieved on: Oct. 10, 2011, Available at: http://help.adobe.com/en_US/InDesign/6.0/WS8599BC5C-3E44-406c-9288-C3B3BBEB5E88.html.

"RSEMCE_235677.EXE—Remote Storage for Exchange v2.0 Mail Client Extension Install", Retrieved on: Oct. 10, 2011, Available at: http://www.symantec.com/business/support/index?page=content&pmv=print&impressions=&viewlocale=&id=TECH10485.

"Spam Filter", Retrieved on: Sep. 26, 2011, Available at: http://www.esoft.com/network-security-appliances/add-ons/spamfilter/.

"Thunderbird Email Thread Visualizer", Published on: Oct. 11, 2011, Available at: http://www.ghacks.net/2009/08/13/thunderbird-email-thread-visualizer/.

"Window Layout—Thunderbird", Retrieved on: Oct. 7, 2011, Available at: http://kb.mozillazine.org/Window_layout_-_Thunderbird.

(56) References Cited

OTHER PUBLICATIONS

Bykov, Vassili, "Hopscotch: Towards User Interface Composition", In Proceedings of International Workshop on Advanced Software Development Tools and Techniques, Jul. 2008, 9 pages.

Dejean, et al., "What's new in IBM Lotus Notes and Domino V8", Published on: Mar. 20, 2007, Available at: http://www.ibm.com/developerworks/lotus/library/notes8-new/.

International Search Report and Written Opinion for PCT/US2012/066691 mailed Feb. 28, 2013.

Majid, et al., "NaCIN—An Eclipse Plug-In for Program Navigation-based Concern Inference", In Proceedings of the OOPSLA Workshop on Eclipse Technology eXchange, Oct. 16, 2005, pp. 70-74.

Rohall, et al., "Email Visualizations to Aid Communications", In Proceedings of Late-Breaking Hot Topics, IEEE Symposium on Information Visualization, Oct. 2011, pp. 12-15.

U.S. Non-Final Office Action for U.S. Appl. No. 13/315,314 mailed Mar. 15, 2013.

U.S. Final Office Action dated Sep. 6, 2013 cited in U.S. Appl. No. 13/315,314, 26 pgs.

U.S. Office Action dated Dec. 19, 2013 cited in U.S. Appl. No. 13/315,314, 21 pgs.

U.S. Office Action dated Jan. 14, 2014 cited in U.S. Appl. No. 13/361,097, 18 pgs.

U.S. Final Office Action dated Feb. 19, 2014 cited in U.S. Appl. No. 13/361,140, 32 pgs.

U.S. Final Office Action dated Jun. 17, 2014 in U.S. Appl. No. 13/315,314, 19 pgs.

U.S. Final Office Action dated Jun. 4, 2014 in U.S. Appl. No. 13/361,097, 27 pgs.

* cited by examiner

INTELLIGENT PRIORITIZATION OF ACTIVATED EXTENSIONS

RELATED APPLICATIONS

Related U.S. patent application Ser. No. 13/361,097, filed on Jan. 30, 2012 and entitled "Extension Activation for Related Documents," assigned to the assignee of the present application, is hereby incorporated by reference in its entirety.

Related U.S. patent application Ser. No. 13/361,140, filed on Jan. 30, 2012 and entitled "Dynamic Extension View With Multiple Levels of Expansion," assigned to the assignee of the present application, is hereby incorporated by reference in its entirety.

BACKGROUND

Extension prioritization may be provided. Software application extensions are computer-executable programming modules that may provide additional information displays and/or functionality to existing software applications. In conventional systems, these extensions can be difficult to manage via a traditional menu or multi-pane structure. In many situations, extension lists are presented to end-users in a rectangular pane wherein multiple contextual extensions may be shown at once. Since each extension needs its own rectangular pane to provide information or functionality to the user, showing multiple extensions can quickly clutter the host application's user interface.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Extension prioritization may be provided. Upon opening a document in a software application, a determination may be made whether the document satisfies a respective activation rule for each of a plurality of application extensions associated with the software application. In response to determining that the document satisfies a respective activation rule for each of a plurality of application extensions associated with the software application a priority may be identified for each of the plurality of application extensions and a user interface element associated with at least one of the plurality of application extensions may be displayed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
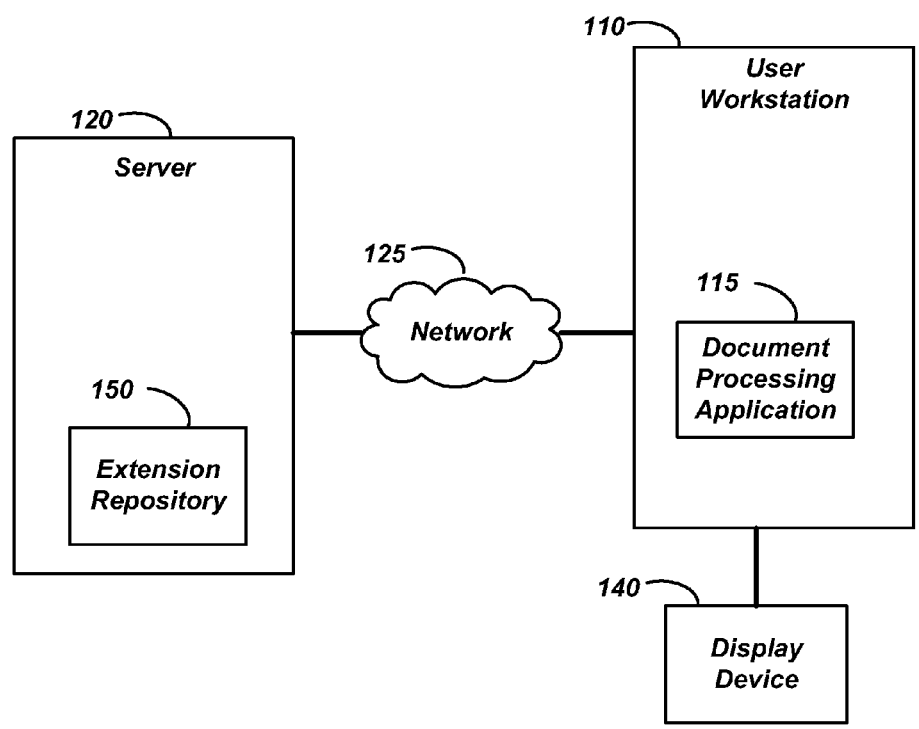
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Software application extensions are computer-executable program modules that may provide additional information displays and/or functionality to existing software applications. Such extensions may be distributed by the original developer of the software application and/or developed by companies and/or individuals not associated with the original developer of the software applications. For example, a third party may develop a mapping extension for use in an e-mail application. Such extensions may be activated within the user interface of the software application and/or may be displayed in new user interface panes (e.g., a separate window.)

Extensions may be activated by trigger conditions, such as those described in the related, co-pending application entitled "Inference-Based Extension Activation," filed on Dec. 9, 2011 and having Ser. No. 13/315,314, which is hereby incorporated by reference in its entirety. For example, documents opened within the software application may result in multiple extensions being activated. Such extensions may be displayed according to an ordering scheme that assists users in focusing on extensions that may be more meaningful and/or important in the context of the document being read.

Contextual extensions may be activated based on rules that are defined in the extension's manifest file. Rules may comprise the type of item the user is currently looking at (e.g. "activate this extension if the item is a message") and/or whether some trigger information can be found in the item's body (e.g., "activate this extension if the item's body contains a hyperlink"). The more restrictive the rule, the fewer items will actually contain the trigger information. An ordering scheme may therefore assume that more restrictive rules are associated with higher priority extensions. Such higher priority extensions may be displayed more prominently than an extension without such a rule. The ordering scheme may take into account other factors such as alphabetical order, order of installation, and/or explicit application programming interface (API) calls to request a priority level.

As an example, a document may be scanned to determine if assorted application extensions may be activated. Extension A may activates if the item being read is a message and if its body contains a video link, Extension B may activate if the item being read is a message, Extension C may activate if the item being read is a message AND if its body contains a phone number, and Extension D may activate if the item being read is a message. Extension B and Extension D are much more likely to activate than Extension A and Extension C. Thus, Extension B and D may comprise "frequent extensions" and Extension A and C may comprise "infrequent extensions."

A user interface (UI) may display activated extensions in a tabular interface according to display rules such as: infrequent extensions may be shown first, in alphabetical order, followed by frequent extensions, in alphabetical order; alphabetical order; order of installation; and/or order of most recent use. For example, given the example extension activation triggers above, the interface may display a tabular interface such as: Extension A|Extension C|Extension B|Extension D. Furthermore, in an effort to "declutter" the UI, the full list of activated extensions may not be shown. Instead, text such as "Show <extension name>+N more extensions" may be displayed, where <extension name> is the name of the first infrequent extension, in alphabetical order, and N the number of additional activated extensions. In the above example, the text may read: "Show Extension A+3 more extensions". This intelligent ordering allows the user to view the name of the extension determined to be most relevant. By choosing to show the name of an infrequent extension, the UI provides more valuable information to the end-user by default.

FIG. 1 is a block diagram of an operating environment 100 for providing extension prioritization comprising a user workstation 110. User workstation 110 may comprise a document processing application 115 and may be operative to interact with a server 120 via a network 125. Server 120 may be operative to execute a plurality of applications and/or services. Document processing application 115 may comprise, for example, a word processing, spreadsheet, presentation, web browser, e-mail and/or other application. User workstation 110 may be operative to output application data and/or user interfaces to a display device 140, such as a monitor and/or touchscreen. User workstation 110 may comprise, for example, an electronic communications device such as a computer, laptop, cellular and/or IP phone, tablet, game console and/or other device. Document processing application 115 may be operative to communicate with server 120 and receive access to a plurality of extensions as configured in an extension repository 150. Extension management application 130 may be operative to provide information technology (IT) administrators with a centralized interface for managing extension settings and access permissions on a per-user, user group, and/or organization wide basis.

Figure 2A:
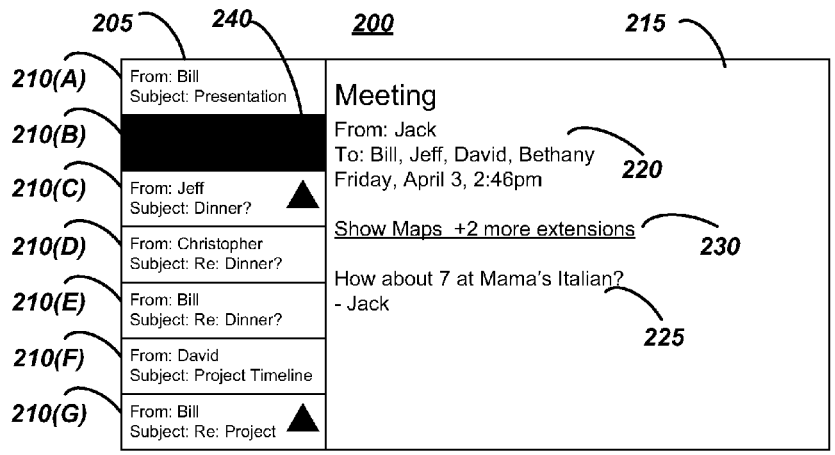
FIGS. 2A-2C are block diagrams of a user interface for providing extension prioritization.

FIG. 2A is a block diagram of a user interface 200 for providing dynamic extension views. User interface 200 may comprise a conversation pane 205 comprising a plurality of messages 210(A)-(G). User interface 200 may highlight a selected message, such as message 210(B), and display additional data associated with the selected message in a message pane 215. For example, message pane 215 may display user interface elements such as a message header 220 and a message text 225. Message pane 215 may further comprise UI element 230 that may indicate that extensions associated with the message are available. For each of plurality of messages 210(A)-(G), an entry point, such as entry point UI element 240 associated with message 210(B), may be displayed that lets the end-user know that the message has activated extensions. If no extensions are activated for the message, the entry point may not be shown.

Figure 2B:
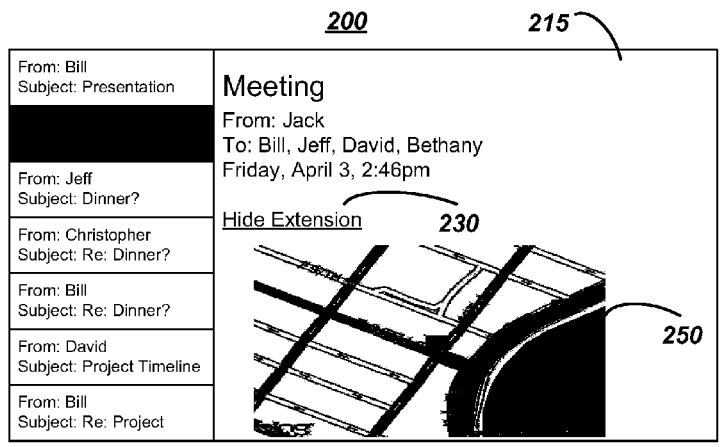

UI element 230 may list the name of an available extension and may also indicate the number of additional extensions that are available. For example, if only one extension is available, UI element 230 may read: "Show <extension name>." If more than one extension is available, UI element 230 may read: "Show <extension name>+N more extensions." When UI element 230 is clicked by a user, an extension pane may be expanded as illustrated in FIG. 2B, below, and display the content of the extension that is explicitly named in the entry point. In at least some embodiments of the invention, selection of UI element 230 may result in display of a tabular interface comprising a tab for each of the available extensions.

FIG. 2B is a block diagram of user interface 200 illustrating an expanded extension pane 250. UI element 230 may changes into "Hide extensions," which, when selected, may collapse extension pane 250. If more than one extension is activated and/or displayed, extension pane 250 may display a tabular interface that allows the end-user to switch between extensions. Consistent with embodiments of the invention, the tabular interface may be displayed instead of the "Show . . . " entry point, a single extension+a "Show all" command that reveals additional extensions may be displayed, and/or extensions may be displayed in a separate UI element (e.g., another window) instead of showing them inline in message pane 215.

Figure 2C:
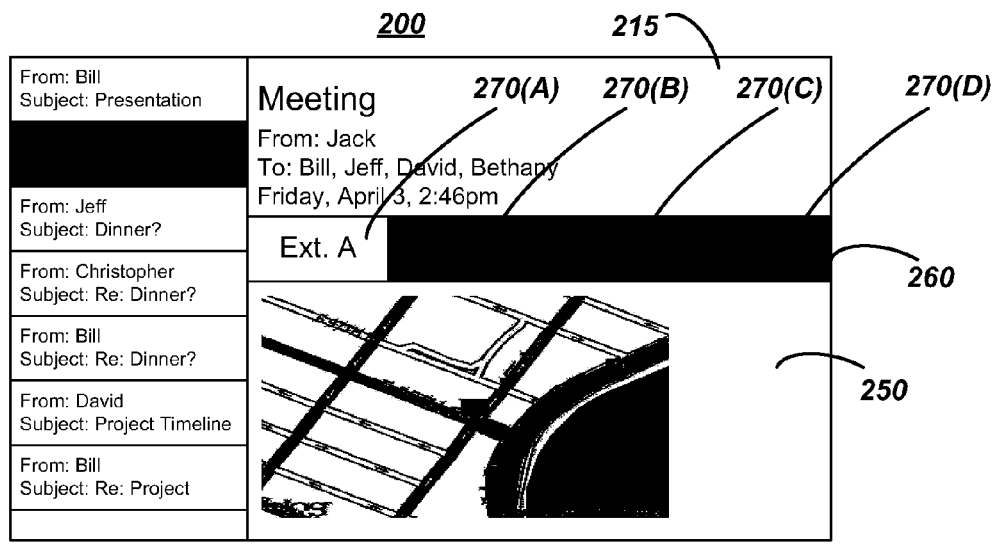

FIG. 2C is a block diagram of user interface 200 illustrating a tabular interface 260. Tabular interface 260 may comprise a plurality of tabs 270(A)-(D) each associated with an application extension. Tabs may be selected by a user and information associated the respective extension may be displayed in extension pane 250. Upon receiving a selection of a different tab, the previous extension's information may be replaced with that of the newly selected tab's extension.

Figure 3:
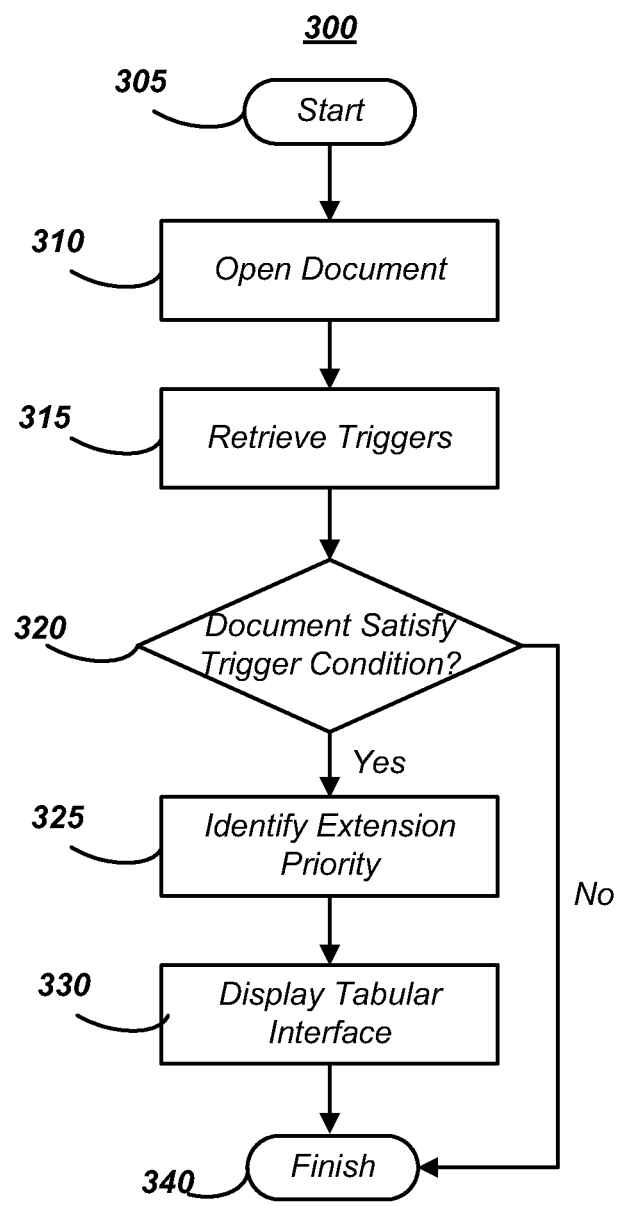
FIG. 3 is a flow chart of a method for providing extension prioritization.

FIG. 3 is a flow chart setting forth the general stages involved in a method 300 consistent with an embodiment of the invention for providing application extension activation. Method 300 may be implemented using a computing device 400 as described in more detail below with respect to FIG. 3. Ways to implement the stages of method 300 will be described in greater detail below. Method 300 may begin at starting block 305 and proceed to stage 310 where computing device 400 may open a document in a software application operative to display at least a list of a plurality of documents. For example, a new message may be opened in an e-mail and/or other messaging application. Other applications may comprise, for example, a document processing application, a productivity application, and/or a web browsing application.

Method 300 may then advance to stage 315 where computing device 400 may retrieve a plurality of activation triggers. For example, each of the plurality of activation triggers may be associated with an application extension for the software application. Such triggers may be stored in configuration manifests associated with each of the plurality of application extensions.

Method 300 may then advance to stage 320 where computing device 400 may determine whether the document satisfies a respective activation rule for at least a subset of a plurality of application extensions associated with the software application. For example, a plurality of application extensions in extension repository 150 may be associated with document processing application 115. The related documents may comprise, for example, a thread of email messages that may be scanned to determine whether content of at least one of those messages satisfies an activation trigger for one and/or more of the application extensions, such as where an address block triggers a map display application extension. Each message may comprise elements that trigger more than one of application extensions, such as where a time and date element triggers a meeting setup extension, a suggested location triggers a map extension, and contact information in a signature block triggers an add contact extension.

If the document is determined to satisfy a respective activation rule for at least the subset of the plurality of application extensions associated with the software application, method 300 may advance to stage 325 where computing device 400 may identify a priority for each of at least the subset of the plurality of application extensions. For example, the identified priority may be based on an order of satisfying at least one of the plurality of activation triggers in the document (e.g., the earlier in the document the trigger is satisfied, the higher the priority), an order of installation of each of the extensions, a frequency of activation of each of the extensions, a priority defined by the document, a priority defined by the software application, and/or a placement of an element in the document that satisfies the activation trigger.

Method 300 may then advance to stage 330 where computing device 400 may display a tabular interface comprising a plurality of tabs each associated with a one of at least the subset of the plurality of application extensions. For example, tabular interface 260 may display selectable tabs for each extension, which may be ordered from left to right according to the priority identified for each of the extensions. Method 300 may then end at stage 340.

An embodiment consistent with the invention may comprise a system for providing application extension management. The system may comprise a memory storage and a processing unit coupled to the memory storage. The processing unit may be operative to open a document in a software application and determine whether the document satisfies a respective activation rule for each of a plurality of application extensions associated with the software application. In response to determining that the document satisfies a respective activation rule for each of a plurality of application extensions associated with the software application, the processing unit may be operative to identify a priority for each of the plurality of application extensions and display a user interface element associated with at least one of the plurality of application extensions.

Another embodiment consistent with the invention may comprise a system for providing extension prioritization. The system may comprise a memory storage and a processing unit coupled to the memory storage. The processing unit may be operative to open at least one document in a software application, retrieve a plurality of activation triggers, wherein each of the plurality of activation triggers is associated with an extension for the software application, and determine whether at least a subset of the plurality of activation triggers is satisfied by the at least one document. In response to determining that the at least a subset of the plurality of activation triggers is satisfied by the at least one document, the processing unit may be operative to identify a priority for each extension associated with each of the at least a subset of the plurality of activation triggers and display a user interface element associated with the extension associated with a one of the at least a subset of the plurality of activation triggers comprising a highest priority.

Yet another embodiment consistent with the invention may comprise a system for providing extension prioritization. The system may comprise a memory storage and a processing unit coupled to the memory storage. The processing unit may be operative to open a document in a software application operative to display at least a list of a plurality of documents, retrieve a plurality of activation triggers, each of which may be associated with at least one of a plurality of application extensions for the software application, and determine whether the document satisfies a respective activation rule for at least a subset of a plurality of application extensions associated with the software application. In response to determining that the document satisfies a respective activation rule for at least the subset of the plurality of application extensions associated with the software application, the processing unit may be operative to identify a priority for each of at least the subset of the plurality of application extensions and display a tabular interface comprising a plurality of tabs each associated with a one of at least the subset of the plurality of application extensions, wherein the plurality of tabs are ordered from left to right according to the priority identified for each of the extensions.

Figure 4:
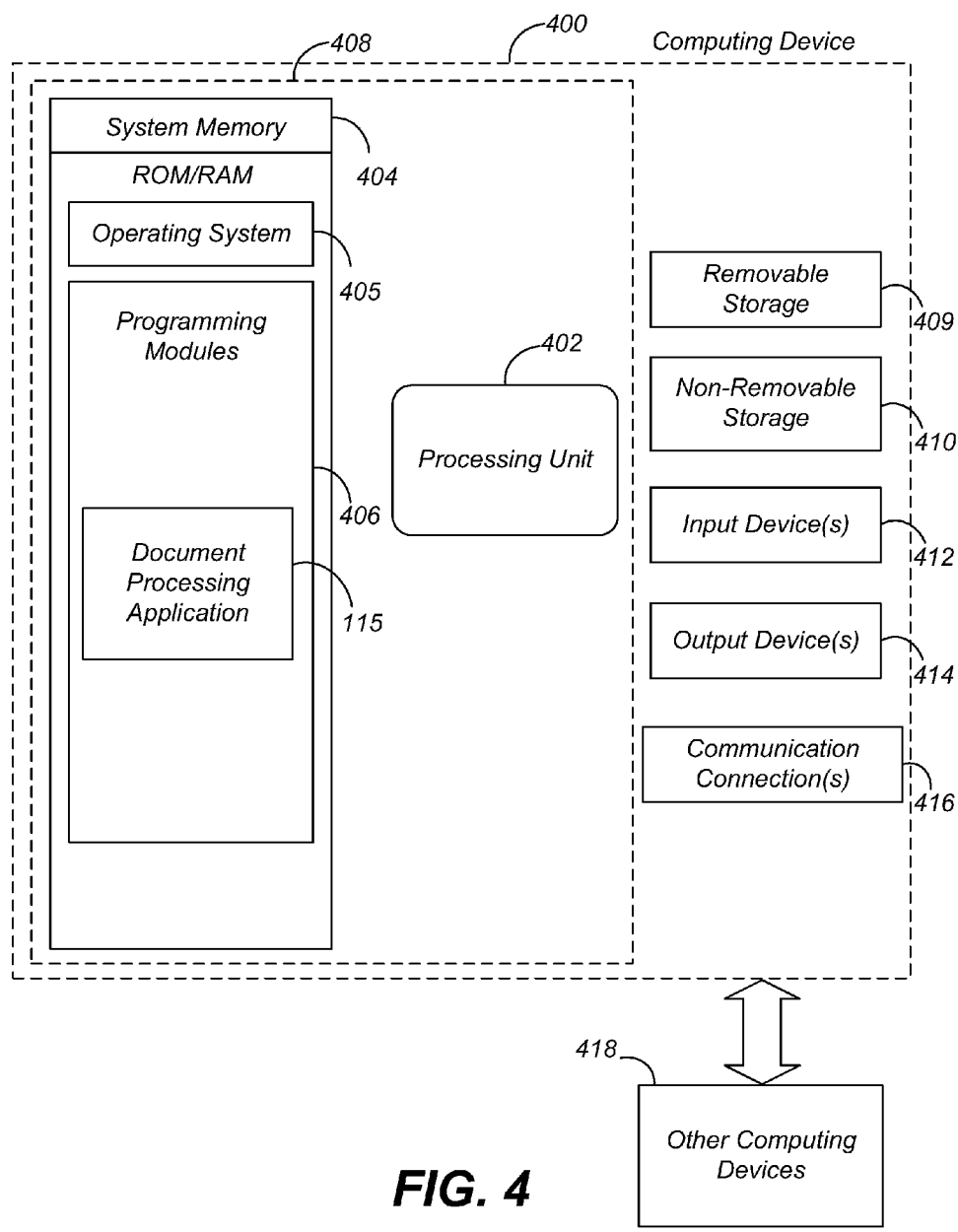
FIG. 4 is a block diagram of a computing device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 4 and the associated descriptions provide a discussion of a variety of operating environments in which embodiments of the invention may be practiced. However, the devices and systems illustrated and discussed with respect to FIG. 4 are for purposes of example and illustration and are not limiting of a vast number of computing device configurations that may be utilized for practicing embodiments of the invention, described herein.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g., read-only memory (ROM)), flash memory, or any combination. System memory 404 may include operating system 405, one or more programming modules 406, and may include document processing application 115. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, a capture device, etc. A capture device may be operative to record a user and capture spoken words, motions and/or gestures made by the user, such as with a camera and/or microphone. The capture device may comprise any speech and/or motion detection device capable of detecting the speech and/or actions of the user. For example, the capture device may comprise a Microsoft® Kinect® motion capture device comprising a plurality of cameras and a plurality of microphones. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A computer-readable hardware storage device which stores a set of instructions which when executed performs a method for providing extension prioritization, the method executed by the set of instructions comprising:
    opening a document in a software application operative to display at least a list of a plurality of documents, wherein the software application comprises at least one of the following: a messaging application, a document processing application, a productivity application, and a web browsing application;
    retrieving a plurality of activation triggers, wherein each of the plurality of activation triggers is associated with at least one of a plurality of application extensions for the software application and each of the plurality of activation triggers is retrieved from a configuration manifest associated with a respective one of the plurality of application extensions,
    determining whether the document satisfies a respective activation rule for at least a subset of a plurality of application extensions associated with the software application; and
    in response to determining that the document satisfies a respective activation rule for at least the subset of the plurality of application extensions associated with the software application:
        identifying a priority for each of at least the subset of the plurality of application extensions, wherein the identified priority is based on at least one of the following: an order of satisfying at least one of the plurality of activation triggers in the document, an order of installation of each of the extensions, a frequency of activation of each of the extensions, a priority defined by the document, a priority defined by the software application, and a placement of an element in the document that satisfies the activation trigger, and
        displaying a tabular interface comprising a plurality of tabs each associated with a one of at least the subset of the plurality of application extensions, wherein the plurality of tabs are ordered from left to right according to the priority identified for each of the extensions.

2. The computer-readable hardware storage device of claim 1, wherein opening the document in the software application comprises opening the document in the software application wherein the software application is operative to display a plurality of selectable documents.

3. The computer-readable hardware storage device of claim 2, further comprising hiding at least one extension associated with a non-selected one of the plurality of selectable documents.

4. The computer-readable hardware storage device of claim 1, wherein displaying the tabular interface comprises displaying a numerical element associated with a count of the plurality of application extensions.

5. A method for providing extension prioritization, the method executed by a processor, the method comprising:
    opening a document in a software application operative to display at least a list of a plurality of documents;
    retrieving a plurality of activation triggers, wherein each of the plurality of activation triggers is associated with at least one of a plurality of application extensions for the software application and each of the plurality of activation triggers is retrieved from a configuration manifest associated with a respective one of the plurality of application extensions,
    determining whether the document satisfies a respective activation rule for at least a subset of a plurality of application extensions associated with the software application; and
    in response to determining that the document satisfies a respective activation rule for at least the subset of the plurality of application extensions associated with the software application:
        identifying a priority for each of at least the subset of the plurality of application extensions, wherein the identified priority is based on at least one of the following: an order of satisfying at least one of the plurality of activation triggers in the document, an order of installation of each of the extensions, a frequency of activation of each of the extensions, a priority defined by the document, a priority defined by the software application, and a placement of an element in the document that satisfies the activation trigger, and
        displaying a tabular interface comprising a plurality of tabs each associated with a one of at least the subset of the plurality of application extensions, wherein the plurality of tabs are ordered from left to right according to the priority identified for each of the extensions.

6. The method of claim 5, wherein opening the document in the software application comprises opening the document in the software application comprising at least one of the following: a messaging application, a document processing application, a productivity application, and a web browsing application is an e-mail client.

7. The method of claim 5, wherein opening the document in the software application comprises opening the document in the software application wherein the software application is operative to display a plurality of selectable documents.

8. The method of claim 7, further comprising hiding at least one extension associated with a non-selected one of the plurality of selectable documents.

9. The method of claim 5, wherein displaying the tabular interface comprises displaying a numerical element associated with a count of the plurality of application extensions.

10. A system for providing extension prioritization, the system comprising:
a memory storage; and
a processor coupled to the memory storage, wherein the processor is operable to:
open a document in a software application operative to display at least a list of a plurality of documents;
retrieve a plurality of activation triggers, wherein each of the plurality of activation triggers is associated with at least one of a plurality of application extensions for the software application and each of the plurality of activation triggers is retrieved from a configuration manifest associated with a respective one of the plurality of application extensions,
determine whether the document satisfies a respective activation rule for at least a subset of a plurality of application extensions associated with the software application; and
in response to determining that the document satisfies a respective activation rule for at least the subset of the plurality of application extensions associated with the software application:
identify a priority for each of at least the subset of the plurality of application extensions, wherein the identified priority is based on at least one of the following: an order of satisfying at least one of the plurality of activation triggers in the document, an order of installation of each of the extensions, a frequency of activation of each of the extensions, a priority defined by the document, a priority defined by the software application, and a placement of an element in the document that satisfies the activation trigger, and
display a tabular interface comprising a plurality of tabs each associated with a one of at least the subset of the plurality of application extensions, wherein the plurality of tabs are ordered from left to right according to the priority identified for each of the extensions.

11. The system of claim 10, wherein the processor being operable to open the document in the software application comprises the processor being operable to open the document in the software application comprising at least one of the following: a messaging application, a document processing application, a productivity application, and a web browsing application is an e-mail client.

12. The system of claim 10, wherein the processor being operable to open the document in the software application comprises the processor being operable to open the document in the software application wherein the software application is operative to display a plurality of selectable documents.

13. The system of claim 12, further comprising the processor being operable to hide at least one extension associated with a non-selected one of the plurality of selectable documents.

14. The system of claim 10, wherein the processor being operable to open display the tabular interface comprises the processor being operable to open display a numerical element associated with a count of the plurality of application extensions.

* * * * *